Oct. 18, 1966 M. G. THASSY 3,279,972
HIGH FRICTION GASKET AND METHOD OF MANUFACTURING SAME
Filed Aug. 3, 1962
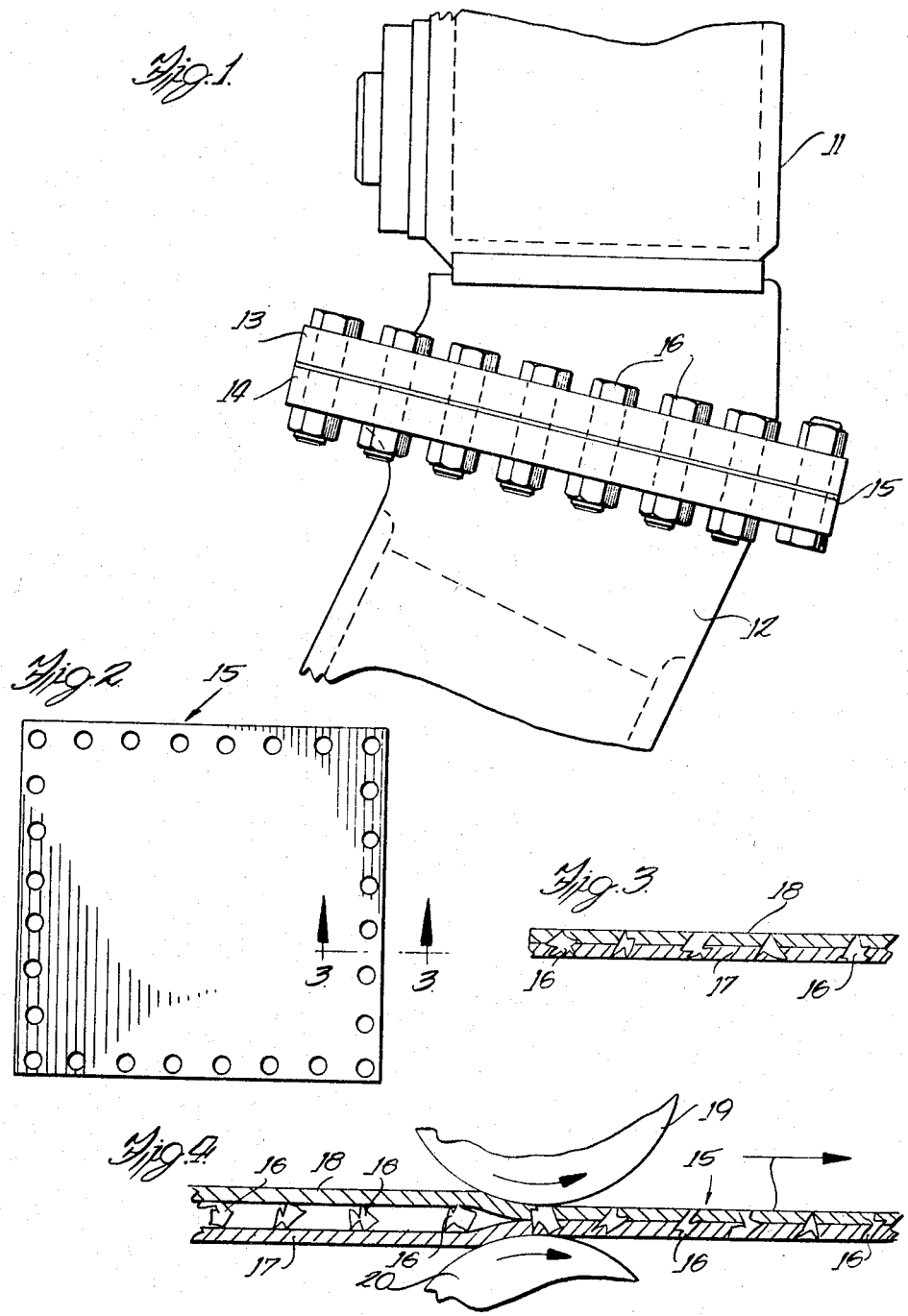
Inventor
Michael G. Thassy
Paul O. Pippel
Attorney

United States Patent Office 3,279,972
Patented Oct. 18, 1966

3,279,972
HIGH FRICTION GASKET AND METHOD OF MANUFACTURING SAME
Michael G. Thassy, Chicago, Ill., assignor to International Harvester Company, Chicago, Ill., a corporation of New Jersey
Filed Aug. 3, 1962, Ser. No. 214,665
5 Claims. (Cl. 161—53)

This invention relates in general to gaskets, and in particular to a new and improved high friction gasket which is adapted to be used between opposed mating surfaces to prevent relative movement therebetween.

In the gasket manufacturing field, it has been conventional to enclose a sheet of metal having a plurality of outwardly struck portions thereon within the gasketing material. Such prior art devices are typified by the gaskets shown in the patent to G. T. Balfe No. 2,720,406 and in the patent to P. F. Niessen No. 2,992,151. While such devices have functioned to provide an effective seal between mating surfaces, they have not proved entirely satisfactory when it was desired to present a frictional element between the mating surfaces. Furthermore, such prior art devices have been prohibitively expensive to manufacture in that a separate metal working step is necessary to provide the outwardly struck portions on the embedded metallic sheet. The general purpose of this invention is therefore, to provide a relatively inexpensive high friction gasket which is adapted to be used between an opposed pair of mating surfaces to prevent relative movement and provide an efficient seal therebetween.

An object of the present invention is the provision of a gasket wherein a plurality of discrete abrasive particles are randomly disposed between a pair of overlying sheets of gasket material.

Another object of the invention is to provide a frictional member between a pair of bolted together surfaces which will function to restrict the relative movement of said surfaces so as to prevent shearing of said bolts.

A further object of the invention is the provision of a gasket which will have high friction characteristics, yet which will provide an efficient seal.

Still another object of the invention is to provide a gasketing material which can be easily fabricated to form gaskets of various shapes.

Other objects and advantages of the invention will herein after become more fully apparent from the following description of the annexed drawings, which illustrate a preferred embodiment, and wherein:

FIGURE 1 is a partial plan view of a tractor C-frame in which the gasket of the present invention is used;

FIGURE 2 is a plan view of the gasket used in FIGURE 1;

FIGURE 3 is a sectional view taken along the line 3—3 of FIGURE 2; and

FIGURE 4 is a diagrammatic view of the compression step in the manufacturing process of the gaskets of the present invention.

Referring now to FIGURE 1, the gasket of the present invention is shown as being used between the front section 11 and one side section 12 of a C-frame, which is used in conjunction with a crawler tractor to mount a bulldozer blade or the like. C-frame sections 11 and 12 are provided with flange portions 13 and 14, respectively, between which gasket 15 is interposed. Flanges 13 and 14, and gasket 15 are provided with a plurality of peripheral apertures, through which bolts 16 extend to secure the C-frame sections into an integral assembly. As can be readily understood, the C-frame is subjected to a severe jolting and twisting type of loading in use, which causes the C-frame sections to exhibit a pronounced tendency to move relative to one another. Because of the variances in tolerances and alignment of the apertures in flanges 13 and 14, bolts 16 are often subjected to an extremely high shearing force when C-frame section 11 moves with respect to section 12. To obviate the problem of the shearing of bolts 16, the high friction gasket 15 of the present invention is interposed between the mating surfaces of flanges 13 and 14.

While the novel gasket of the present invention is herein illustrated as having particular utility in the aforedescribed C-frame structure, it should be pointed out that the gasket would have desirable utility in any structure where it is desired to restrict the movement between two mating surfaces, such as between the wheel brake spider and brake drum of a heavy truck, or between the flanges of a pipe connection.

The method of manufacturing gasket 15 will be best understood from an examination of FIGURE 4. A plurality of abrasive particles 16, each having many jagged edges, are uniformly distributed over a sheet of gasket material 17. A second sheet of gasket material 18 is disposed in overlying relation to abrasive particles 16 and gasket sheet 17, and the resulting sandwich assembly is passed between compressing rolls 19 and 20.

The thickness of sheets 17 and 18 is approximately one-half the size of the average abrasive particle 16. As will be apparent upon a perusal of FIG. 4, the aforementioned average size is the vertical height, of that dimension transverse to the plane of the sheet, of the particles 16 in their settled or equilibruim position after being distributed on the lower sheet 17. This enables the jagged edges of particle 16 to become firmly enmeshed within sheets 17 and 18 without extending any appreciable distance outwardly from the surfaces of sheets 17 and 18.

Any sharp corners which protrude between sheets 17 and 18 will be broken away as the structure is passed between compressing rolls 19 and 20. This is important when the gasket is used as an oil sealing member in that it prevents the corners from being broken away in use and falling into the oil.

While the present invention contemplates that the abrasive particles 16 may be formed from any commercially available abrasives, silicon carbides have been found particularly desirable when used in conjunction with such gasket sheet materials such as aluminum, copper, soft steel, paper, asbestos, or elastomeric materials.

It should be understood that the foregoing disclosure relates to only a preferred embodiment of the invention, and that numerous modifications and alterations may be made therein without departing from the spirit or scope of the invention as set forth in the appended claims.

What is claimed is:

1. A gasket adapted to be used between two mating surfaces comprising: a plurality of overlying sheets of gasket material, abrasive particles disposed between said sheets, said abrasive particles having portions imbedded in said sheets so as to be restrain relative movement therebetween, each of said particles extending through said sheets and having exposed areas engageable with said mating surfaces whereby slipping of said surfaces is prevented.

2. The invention set forth in claim 1 wherein said particles are uniformly distributed between said sheets.

3. The invention set forth in claim 1 wherein the thickness of each of said sheets is approximately one-half the average vertical height of said particles.

4. The invention set forth in claim 3 wherein said particles are silicon carbide.

5. The method of manufacturing a gasket comprising the steps of: uniformly distributing a plurality of discrete abrasive particles upon a first sheet of gasket material, disposing a second sheet of gasket material in overlying relation with respect to said first sheet and said particles, and simultaneously forcing each of said particles through both of said sheets, compressing said sheets into a unitary structure, and breaking away those portions of said particles which protrude beyond said sheets.

References Cited by the Examiner

UNITED STATES PATENTS

| | | | |
|---|---|---|---|
| 1,798,246 | 3/1931 | Braner | 277—235 |
| 2,055,471 | 9/1936 | Balfe | 277—235 |
| 2,136,734 | 11/1938 | Denman | 161—111 |
| 2,171,530 | 9/1939 | Balfe | 156—92 |
| 2,185,908 | 1/1940 | Balfe | 156—92 |
| 2,386,780 | 10/1945 | Cross | 156—298 |
| 2,404,207 | 7/1946 | Ball | 156—62.2 X |

EARL M. BERGERT, *Primary Examiner.*

H. F. EPSTEIN, *Assistant Examiner.*